United States Patent
Liao

(10) Patent No.: US 8,474,312 B2
(45) Date of Patent: Jul. 2, 2013

(54) TIRE PRESSURE MONITOR

(75) Inventor: Wen-Ping Liao, New Taipei (TW)

(73) Assignee: Josn Electronic Co., Ltd., New Taipei (TW)

(*) Notice: Subject to any disclaimer, the term of this patent is extended or adjusted under 35 U.S.C. 154(b) by 25 days.

(21) Appl. No.: 13/309,715

(22) Filed: Dec. 2, 2011

(65) Prior Publication Data
US 2013/0139582 A1 Jun. 6, 2013

(51) Int. Cl.
*B60C 23/02* (2006.01)

(52) U.S. Cl.
USPC ........................................................ 73/146.8

(58) Field of Classification Search
USPC ................................................ 73/146–146.8
See application file for complete search history.

(56) References Cited

U.S. PATENT DOCUMENTS

| | | | |
|---|---|---|---|
| 5,844,131 A * | 12/1998 | Gabelmann et al. | 73/146.8 |
| 7,804,397 B2 * | 9/2010 | Shigihara et al. | 340/447 |
| 2003/0000297 A1 * | 1/2003 | Ito et al. | 73/146 |
| 2003/0015030 A1 * | 1/2003 | Gabelmann | 73/146 |
| 2003/0066343 A1 * | 4/2003 | Fischer et al. | 73/146 |
| 2003/0110850 A1 * | 6/2003 | Saheki | 73/146 |
| 2003/0154779 A1 * | 8/2003 | Polenghi | 73/146.8 |
| 2004/0119584 A1 * | 6/2004 | Kayukawa | 340/445 |
| 2004/0163456 A1 * | 8/2004 | Saheki et al. | 73/146.8 |
| 2006/0125612 A1 * | 6/2006 | Okubo et al. | 340/445 |
| 2006/0272402 A1 * | 12/2006 | Yin et al. | 73/146.8 |

* cited by examiner

*Primary Examiner* — Andre Allen
(74) *Attorney, Agent, or Firm* — Rosenberg, Klein & Lee

(57) ABSTRACT

A tire pressure monitor enables the TPMS (Tire Pressure Monitoring System) in a tire to detect and send a tire pressure signal from an air faucet to the outer side of the wheel rim by an antenna connecting line, and uses an insulation sleeve to isolate an electrical transmission between the air faucet and an external air faucet so that the whole external air faucet becomes an insulating and independent transmitting antenna which can be unaffected by the serious shield from the wheel rim or steel wire annulus. Therefore, the tire pressure can be measured directly by the tire pressure detector inside of the tire and the transmitting signal can be sent accurately to the receiver in the vehicle in order to enhance the reliability of measuring tire pressure and driving safety.

5 Claims, 7 Drawing Sheets

TIRE PRESSURE MONITOR

BACKGROUND OF THE INVENTION

1. Field of the Invention

The present invention relates to a tire pressure monitor and more particularly, to a tire pressure detector installed inside a tire, which provides an insulation sleeve to isolate the electrical transmission between an external air faucet and the tire pressure detector so that the external air faucet becomes an independent transmitting antenna being unaffected by the shield from the steel wire tire.

2. Description of the Related Art

After some time of driving, exposure to the sunlight or the fall of temperature at night, the tire may lead to some extent and the tire pressure will fall down under a normal pressure of 28 psi. It brings a potential danger for the driving safety. Particularly, if one tire of a high speeding vehicle due to the insufficient tire pressure breaks up, the result is very destructive.

Therefore, plenty of researchers have been devoting to developing this kind of detecting and monitoring devices that monitor the tire pressure during driving. Such disclosures include TW 536489, TW 400811, TW 149143, TW 177543, TW 560445, TW 574977, TW 090946, TW 100539, TW 396974, etc. The working principles of above mentioned patents can be divided into electronic detecting and mechanical detecting groups. The life span of the mechanical one is relatively shorter, and the device body is bigger and the detecting precision is not good at the same time. Such kind of mechanical detecting devices is not the object of the invention so that no further descriptions thereto are given hereinafter.

The most popular design of electronic tire pressure detecting apparatus is installed in the steel wheel rim for the tire. Such kind of apparatus has been disclosed in TW 404354, TW 578706, TW 578707, etc. The advantage of the design is that the tire pressure can be measured directly by the tire pressure monitoring apparatus inside of the tire. The main structure is shown in FIGS. 1 and 2. It consists of a body 11 and a detecting circuit board 12 which is set in the body 11. This circuit board 12 has a signal transmission antenna 13 and two batteries 14 which supply power to this circuit board 12. In the front of the body, an air inlet 15 is mounted. When the above described components are assembled into a tire pressure monitoring apparatus 10 (shown in the FIG. 2), the whole set will be fixed on a steel wheel rim 21 inside of the tire 20. The air inlet 15 penetrates this steel wheel rim 21 and it is fastened by a plate 16 and a screw 17. At last a protecting head 18 will be screwed up and the assembly is finished.

The above mentioned conventional tire pressure monitoring apparatus 10 will transmit a signal through the signal transmission antenna 13, when it detects an abnormal tire pressure. The warning signal will be received by a receiver (not shown in the drawings) in the vehicle and the driver acquires a message about the abnormal tire pressure. However, the signal transmission antenna 13 is mounted in the tire 20 structured with a plurality of layers and with a steel wire annulus 22. Thus, the wireless signal, when being transmitted, is covered by the steel wire annulus 22 inside the tire, due to an electromagnetic eave, or the transition of wireless signal is interfered by the wheel rim 21, thereby accuracy and reliability being poor, which is the defect of this mentioned tire pressure monitoring apparatus.

Although some researchers try to extend the signal transmission antenna 13 to the air inlet 15 outside of the wheel rim 21, the signal still could not be sent out of the tire 20. It is the problem of prior designs which cannot effectively transmit the signal. Therefore, it is desirable to provide a tire pressure monitor, which achieves effective transmission effect.

SUMMARY OF THE INVENTION

It is a primary object of the present invention to provide a tire pressure monitor, which enables the TPMS (Tire Pressure Monitoring System) in the tire to detect and send a tire pressure signal from the air faucet to the outer side of the wheel rim by the antenna connecting line, and uses the insulation sleeve to isolate the electrical transmission between the air faucet and the external air faucet so that the whole external air faucet becomes an insulating and independent transmitting antenna which is unaffected by the serious shield from the wheel rim or steel wire annulus; therefore, the tire pressure can be measured directly by the tire pressure detector inside of the tire and the transmitting signal can be sent accurately to the receiver in the vehicle.

In order to achieve the above-mentioned object, the invention includes a tire pressure detector having a body, the body being provided on a wheel rim inside a tire, and a tire pressure monitor PCB being provided in the body; an air faucet made of metal and provided at a front end of the tire pressure detector, the outside of the air faucet being in the form of threads, a leakproof cushion being set around the root, the air faucet being clamped with a screw nut after an external part of the air faucet passes through a piercing hole of the wheel rim so that a first conducting hole being axially formed, and the external part of the first conducting hole is formed into a first connector; an antenna connecting line having both ends pass through the first conducting hole, and an inside end thereof electrically connecting an antenna contact on the tire pressure monitor PCB; an external air faucet made of metal conductor, a second conducting hole being axially provided in the external air faucet, the internal part of the second conducting hole is formed into a second connector corresponding to the first connector of the first conducting hole, the second connector and the first connector being connected end to end, and electrically connecting an outside end of the antenna connecting line, and an air faucet bolt being provided outside of the second conducting hole; and an insulation sleeve having an axial hole and being provided between the first connector and the second connector in order to isolate the electrical transmission ion between the air faucet and the external air faucet so that the external air faucet being formed to be an independent transmitting antenna without an interference from the tire.

Based on the technical features disclosed, the preferred embodiment includes the internal diameter of the first connector being larger than the external diameter of the second connector for the second connector to extend into the internal diameter of the first connector, and the insulation sleeve being fixed between the internal diameter of the first connector and the external diameter of the second connector.

Another preferred embodiment includes the external diameter of the first connector being smaller than the internal diameter of the second connector for the first connector to extend into the internal diameter of the second connector, and the insulation sleeve being fixed between the external diameter of the first connector and the internal diameter of the second connector.

Whereby, the present invention enables the external air faucet to be an independent transmitting antenna by using the insulation sleeve. When transmitting the wireless signal, the receiver in the vehicle accurately receives the tire pressure detected signal without the interference from the tire or the wheel rim to enhance the reliability of measuring tire pressure and driving safety.

BRIEF DESCRIPTION OF THE DRAWINGS

The accomplishment of this and other objects of the invention will become apparent from the following descriptions and its accompanying drawings of which.

DETAILED DESCRIPTION OF THE PREFERRED EMBODIMENT

Referring to FIGS. 3 through 7, the preferred embodiment of a tire pressure monitor in accordance with the present invention comprises a tire pressure detector 30, an air faucet 40, an antenna connecting line 70, an external air faucet 60, and an insulation sleeve 50.

Figure 7:
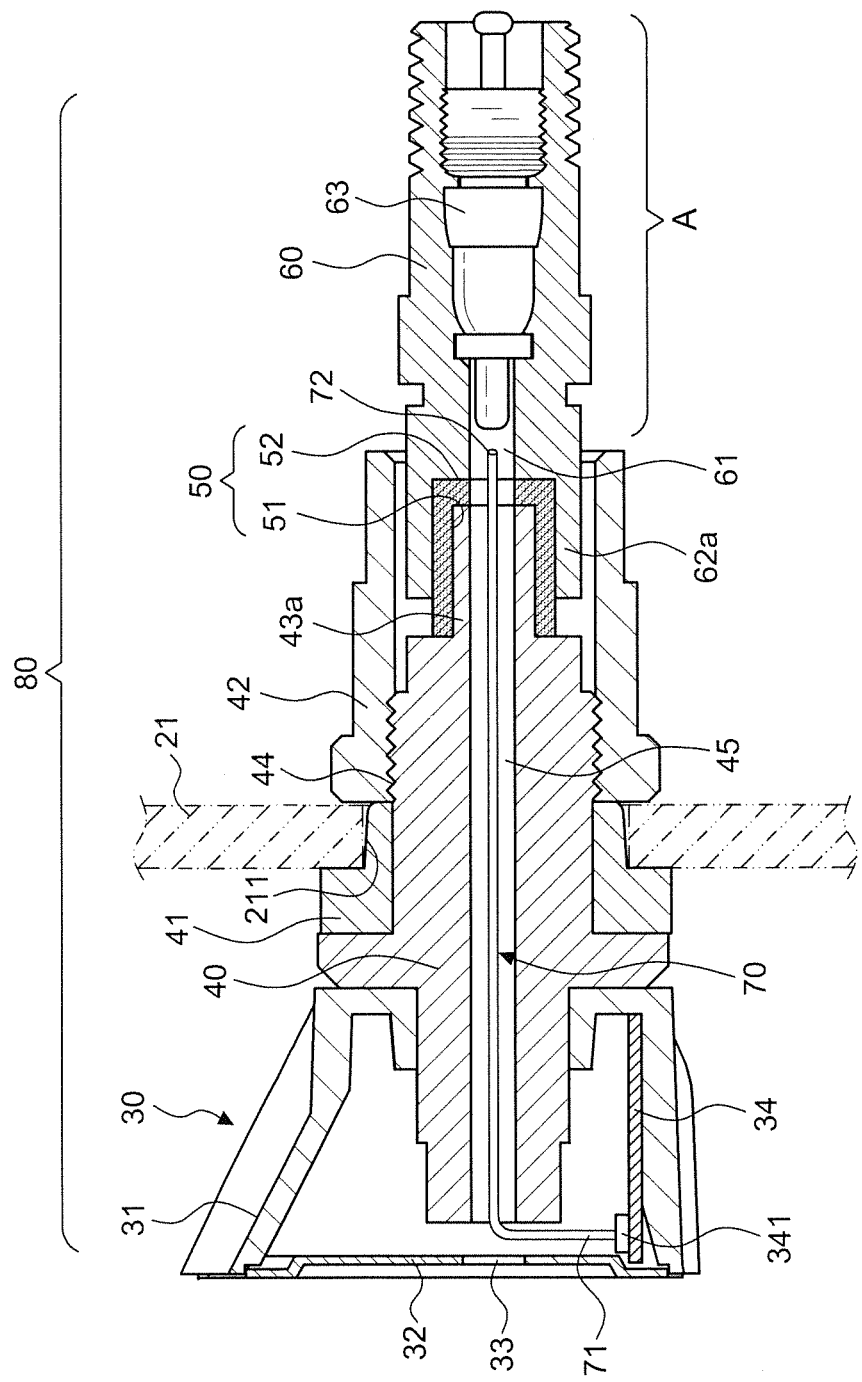
FIG. 7 is a sectional view of another embodiment of the present invention.

The tire pressure detector 30 has a body 31 which is provided on a wheel rim 21 inside a tire 20. With reference to FIG. 7, a tire pressure monitor PCB 34 and an antenna contact 341 are provided in the body 31. A circuit of the TPMS (Tire Pressure Monitoring System) and IC are set on the tire pressure monitor PCB 34. However, TPMS is not the feature of the present invention so it is not to be illustrated in this specification.

Figure 1:
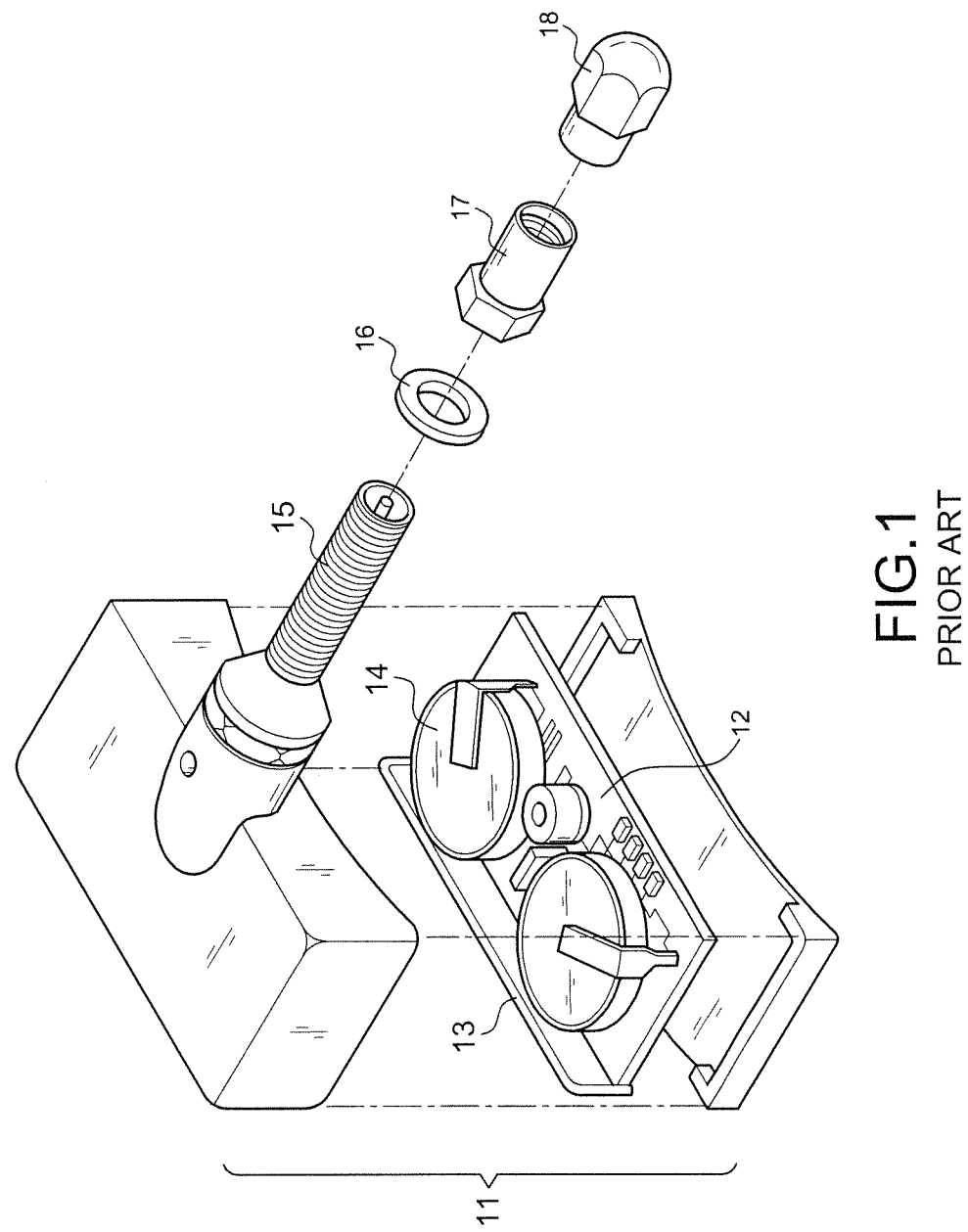
FIG. 1 is a perspective exploded view of a conventional tire pressure monitor.
Figure 2:
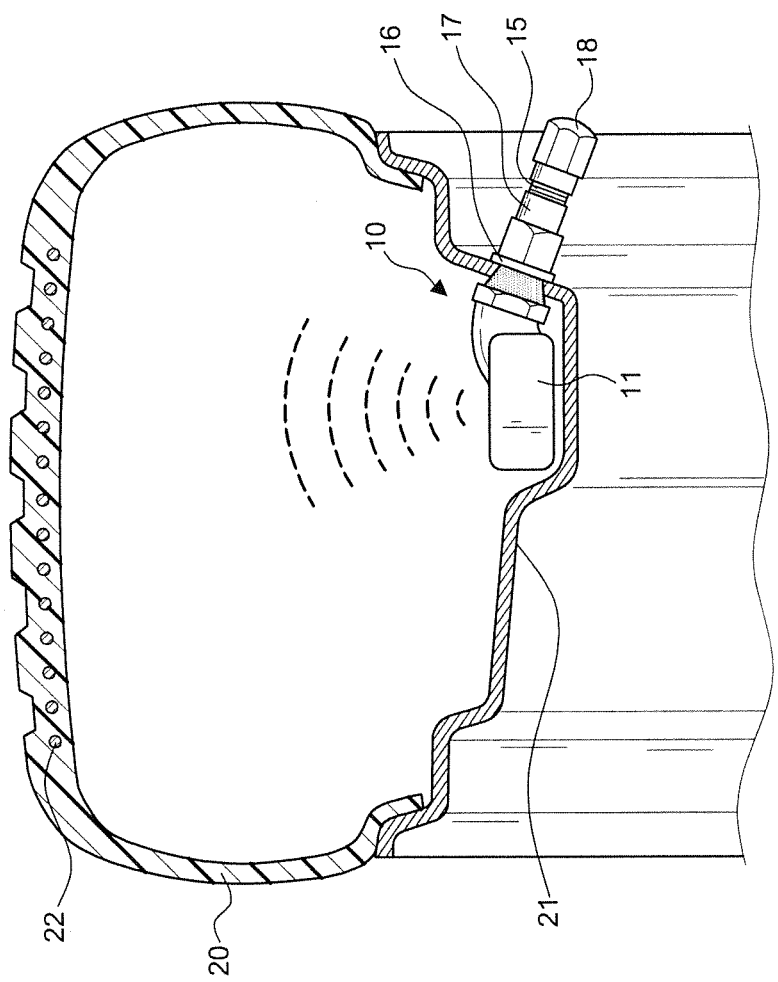
FIG. 2 is a reference view of a service condition of the conventional tire pressure monitor.
Figures 3, 4:
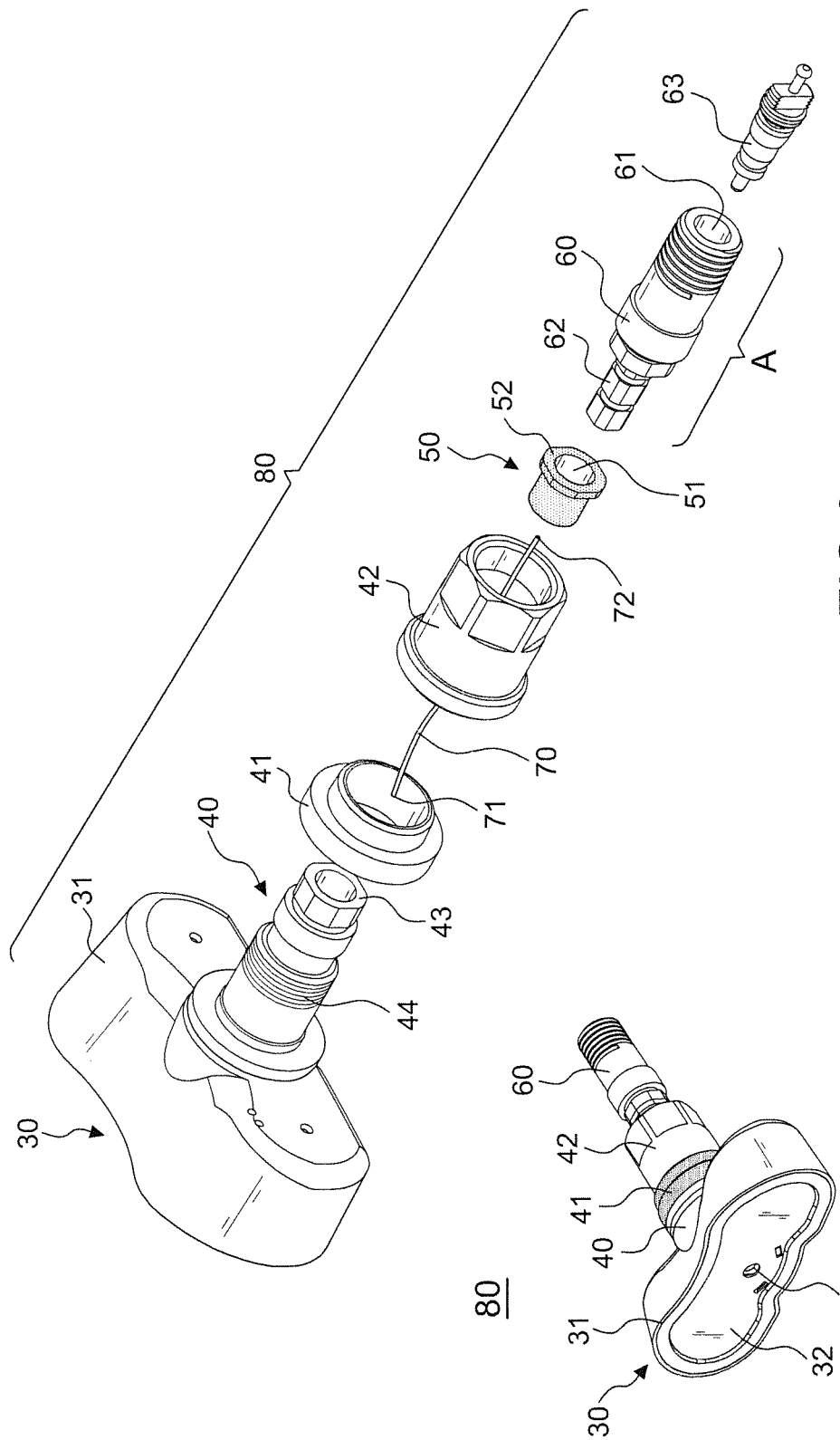
FIG. 3 is a perspective exploded view of the present invention.
FIG. 4 is a perspective assembly drawing of the present invention.
Figure 5:
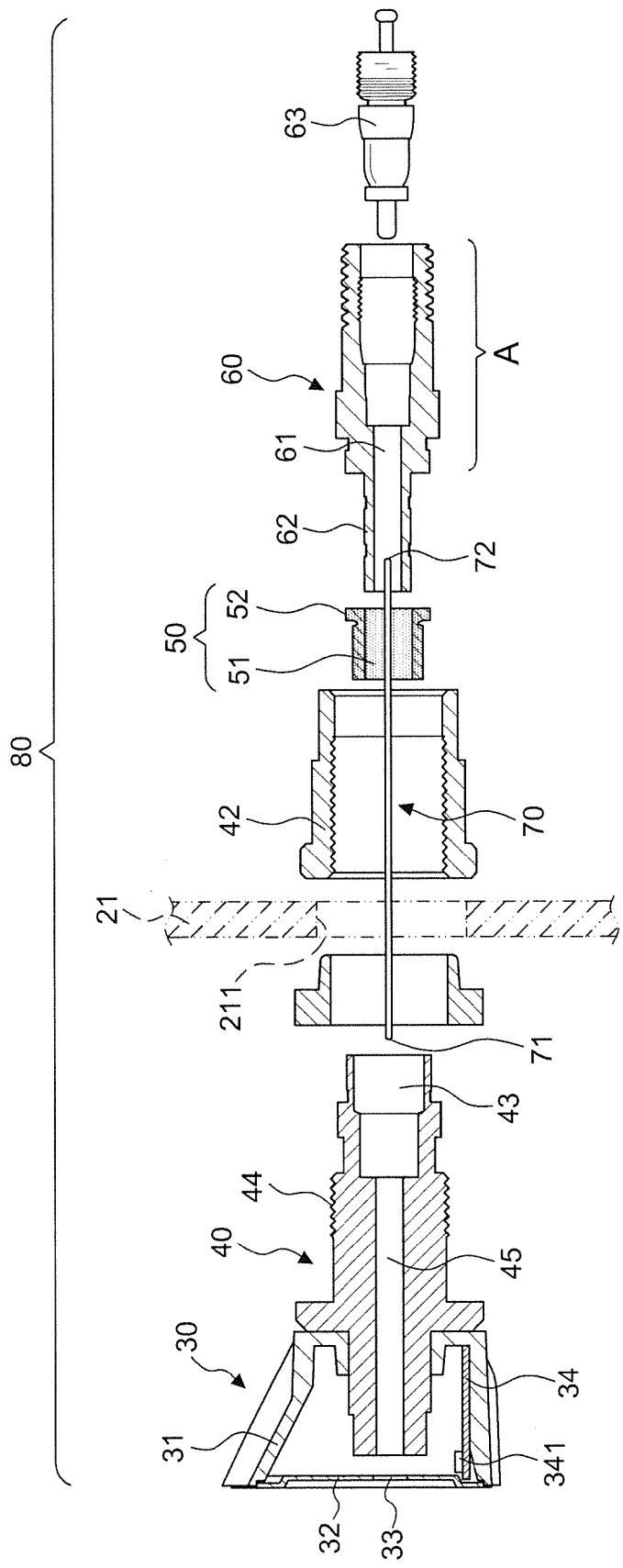
FIG. 5 is an exploded sectional view of the present invention.

The air faucet 40 made of metal has a sufficient mechanic strength. With reference to FIG. 3, the air faucet 40 is provided at a front end of the tire pressure detector 30, the outside thereof is in the form of threads 44, and a leakproof cushion 41 is set around the root. The air faucet 40 is clamped with a screw nut 42 after an external part of the air faucet 40 passes through a piercing hole 211 of the wheel rim 21 so that a first conducting hole 45 is axially formed, and the external part of the first conducting hole 45 is formed into a first connector 43.

The antenna connecting line 70 has both ends passing through the first conducting hole 45, and an inside end 71 thereof electrically connects the antenna contact 341 on the tire pressure monitor PCB 34.

The external air faucet 60 is made of metal conductor. A second conducting hole 61 is axially provided in the external air faucet 60 and the internal part of the second conducting hole 61 is formed into a second connector 62 corresponding to the first connector 43 of the first conducting hole 45. The second connector 62 and the first connector 43 are connected end to end, and electrically connecting an outside end 72 of the antenna connecting line 70. Further, an air faucet bolt 63 is provided outside of the second conducting hole 61. In the preferred embodiment, the inside end 71 of the antenna connecting line 70 electrically connects the antenna contact 341 on the tire pressure monitor PCB 34 after the outside end 72 of the antenna connecting line 70 is fixed in the second conducting hole 61 of the external air faucet 60 and passes through the first conducting hole 45. Further, a cover plate 32 is provided on the back side of the body 31 of the tire pressure detector 30 for fixing on the tire pressure detector 30 after the antenna connecting line 70 finishes setting. In the preferred embodiment, more than one through hole 33 is provided on the cover plate 32 for measuring the air pressure in the tire 20. However, the position of the through hole 33 can also be provided on the body 31 of the tire pressure detector 30 as long as the air pressure can be measured.

The aforesaid air faucet 40 must have enough mechanic strength in order to be fixed on the wheel rim 21. Thus, there will be an electrical transmission when the external air faucet 60 is directly connected to the air faucet 40. After several tests, the inventor found out that if the external air faucet 60 is not separated from the air faucet 40, the whole external air faucet 60 will be affected by the tire 20 and the wheel rim 21 so that the signal cannot be transmitted effectively.

Therefore, the main feature of the present invention is an insulation sleeve 50 having an axial hole and being provided between the first connector 43 and the second connector 62. In this embodiment, the insulation sleeve 50 is an independent molding arranged on the outside of the first connector 43 but it is not a limitation. The insulation sleeve 50 can also be an injection molding coated outside of the second connector 62. In this embodiment, the internal diameter of the first connector 43 is larger than the external diameter of the second connector 62 for the second connector 62 to extend into the internal diameter of the first connector 43, and the insulation sleeve 50 is fixed between the internal diameter of the first connector 43 and the external diameter of the second connector 62.

The insulation sleeve 50 is made of rubber, plastic or any kind of insulating materials. In the preferred embodiment, the inner margin surface of the outside end of the first conducting hole 45 is in the form of the crew threads, close fit or tenon while the outside of the insulation sleeve 50 is in the form of the threads, close fit or tenon for connecting to each other. In this embodiment, the outer side surface of the insulation sleeve 50 has a flange 52 for separating the air faucet 40 from the external air faucet 60 but it is not a limitation. The flange 52 shown as in FIG. 6 is outward extended in a radial direction.

FIG. 7 illustrates another embodiment having the same structure as the aforesaid embodiment, wherein the external diameter of the first connector 43a is smaller than the internal diameter of the second connector 62a for the first connector 43a to extend into the internal diameter of the second connector 62a, and the insulation sleeve 50 is fixed between the external diameter of the first connector 43a and the internal diameter of the second connector 62a. The insulation sleeve 50 is also provided for separating the air faucet 40 from the external air faucet 60 and the outer side surface of the insulation sleeve 50 has a flange 52 inward extended in a radial direction.

As the air faucet 40 and the external air faucet 60 are connected by the non-metallic insulation sleeve 50, the connection strength is not strong enough. Therefore, the aforesaid connection method shows that the second connector 62 extends into the first connector 43 and the first connector 43a extends into the second connector 62a for fixing the insulation sleeve 50 between the first and the second connector. The result of practical test shows that the connection strength of the above-mentioned connection structure is similar to the mechanic strength of the general air faucet so that the air faucet 40 and the external air faucet 60 can be tightly connected.

Figure 6:
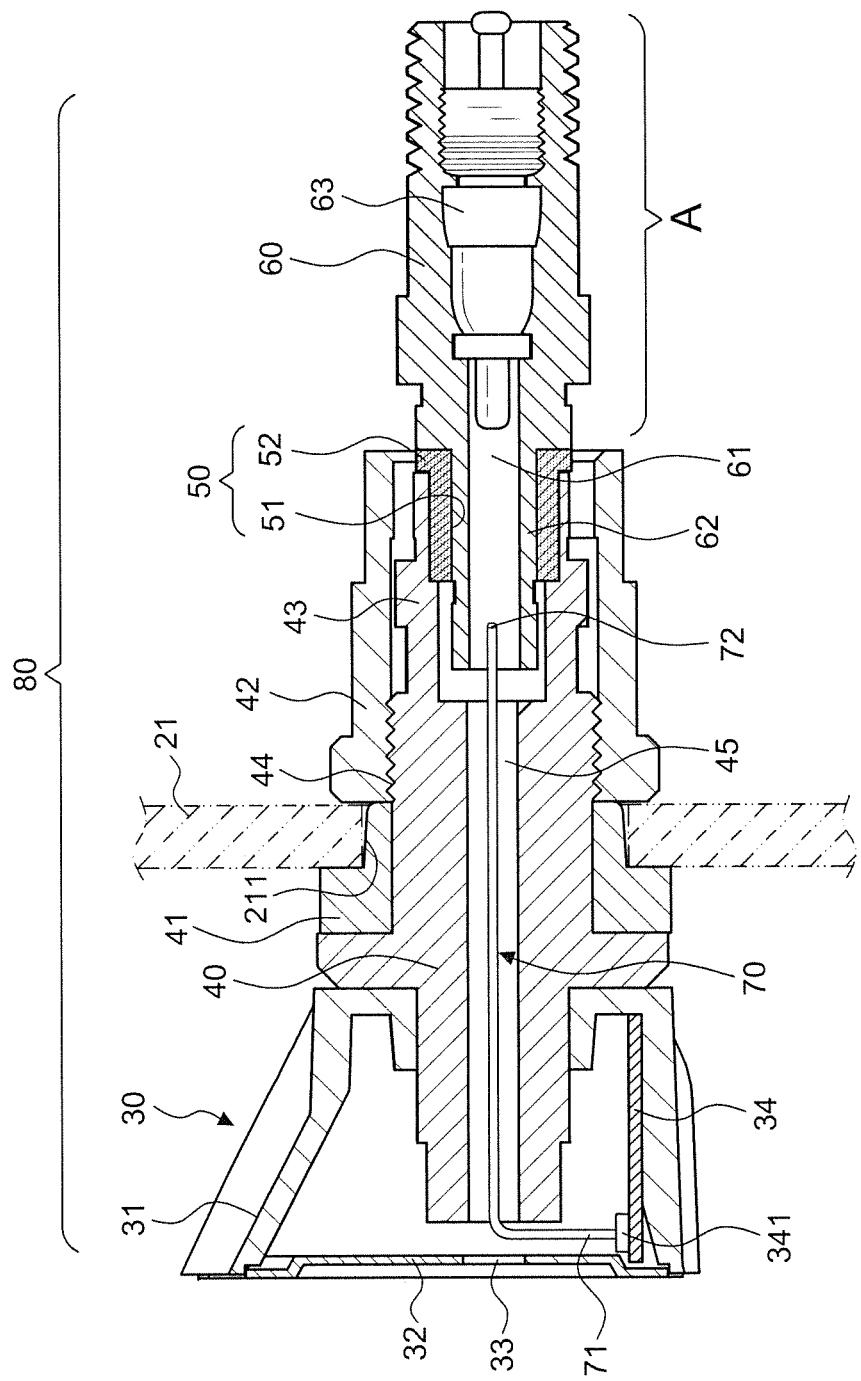
FIG. 6 is an exploded assembly drawing of the present invention.
Figure 8:
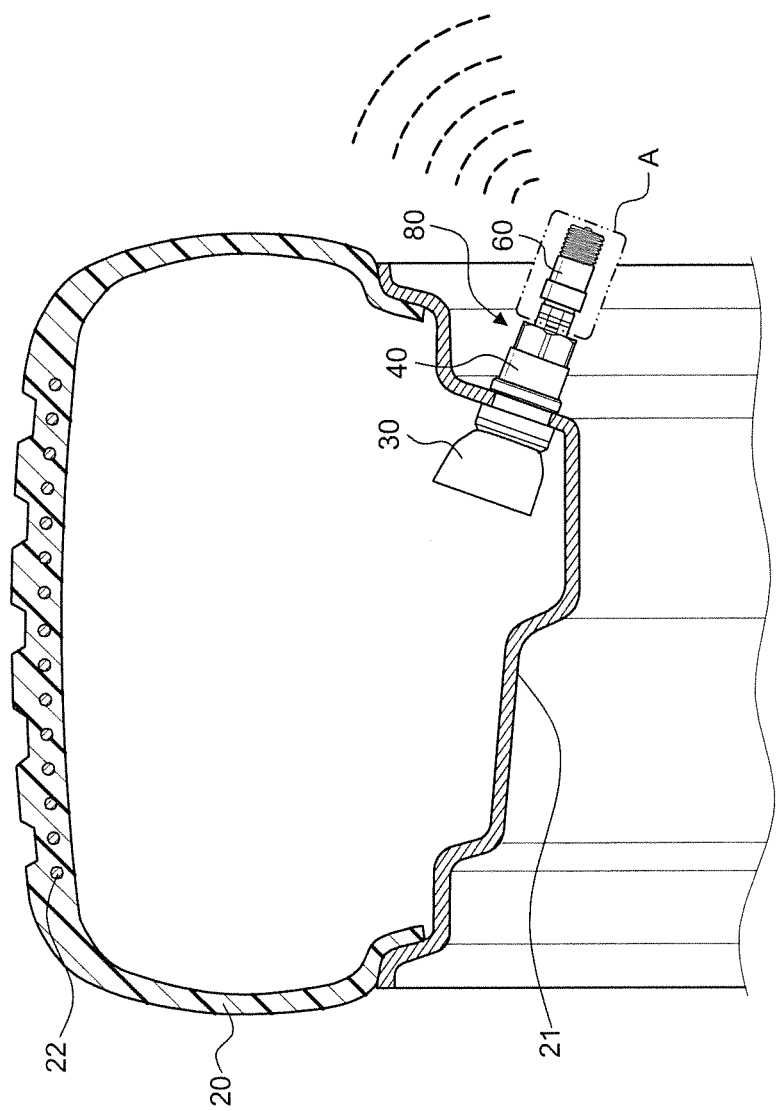
FIG. 8 is a reference view of a service condition of the invention.

Based on the technical features disclosed, the present invention as shown in FIGS. 6 to 8, the prior air faucet is separated into two parts, the air faucet 40 and the external air faucet 60, and the insulation sleeve 50 is provided for isolating the electrical transmission between the air faucet 40 and the external air faucet 60 so that the external air faucet 60 is formed to be an independent transmitting antenna A which is unaffected by the interference from the tire 20 or the wheel rim 21.

Therefore, the tire pressure monitor 80 in accordance with the present invention enables the external air faucet 60 to be an independent transmitting antenna A by using the insulation sleeve 50. When transmitting the wireless signal, the receiver in the vehicle accurately receives the tire pressure detected signal without the interference from the tire 20 or the wheel rim 21 to enhance the reliability of measuring tire pressure and driving safety.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A tire pressure monitor having a tire pressure detector installed inside a tire, comprising:
    a tire pressure detector having a body, the body being provided on a wheel rim inside a tire, and a tire pressure monitor PCB being provided in the body;
    an air faucet made of metal and provided at a front end of the tire pressure detector, the outside of the air faucet being in the form of threads, a leakproof cushion being set around the root, the air faucet being clamped with a screw nut after an external part of the air faucet passes through a piercing hole of the wheel rim so that a first conducting hole being axially formed, and the external part of the first conducting hole is formed into a first connector;
    an antenna connecting line having both ends pass through the first conducting hole, and an inside end thereof electrically connecting an antenna contact on the tire pressure monitor PCB;
    an external air faucet made of metal conductor, a second conducting hole being axially provided in the external air faucet, the internal part of the second conducting hole is formed into a second connector corresponding to the first connector of the first conducting hole, the second connector and the first connector being connected end to end, and electrically connecting an outside end of the antenna connecting line, and an air faucet bolt being provided outside of the second conducting hole; and
    an insulation sleeve having an axial hole and being provided between the first connector and the second connector in order to isolate the electrical transmission between the air faucet and the external air faucet so that the external air faucet being formed to be an independent transmitting antenna without an interference from the tire.

2. The tire pressure monitor as claimed in claim 1, wherein the internal diameter of the first connector is larger than the external diameter of the second connector for the second connector to extend into the internal diameter of the first connector, and the insulation sleeve is fixed between the internal diameter of the first connector and the external diameter of the second connector.

3. The tire pressure monitor as claimed in claim 2, wherein the outer side surface of the insulation sleeve has a flange outward extended in a radial direction.

4. The tire pressure monitor as claimed in claim 1, wherein the external diameter of the first connector is smaller than the internal diameter of the second connector for the first connector to extend into the internal diameter of the second connector, and the insulation sleeve is fixed between the external diameter of the first connector and the internal diameter of the second connector.

5. The tire pressure monitor as claimed in claim 4, wherein the outer side surface of the insulation sleeve has a flange inward extended in a radial direction.

* * * * *